United States Patent [19]

Ono

[11] Patent Number: 5,025,907

[45] Date of Patent: Jun. 25, 1991

[54] SELECTIVELY OPERABLE SPLIT RING CLUTCH

[76] Inventor: Harry Ono, 1890 Big Ben Dr., Des Plaines, Ill. 60061

[21] Appl. No.: 526,827

[22] Filed: May 22, 1990

[51] Int. Cl.⁵ .................................................. F16D 19/00
[52] U.S. Cl. .................................. 192/80; 192/107 T; 192/93 R
[58] Field of Search .................. 192/35, 37, 54, 56 C, 192/56 R, 74, 80, 85 A, 93 K, 99 B, 107 T

[56] References Cited

U.S. PATENT DOCUMENTS

| Re. 10,365 | 8/1883 | Carver | 192/93 R X |
|---|---|---|---|
| 206,072 | 7/1878 | Bates | 192/93 R X |
| 1,952,415 | 3/1934 | Brownlee | 192/107 T X |
| 1,978,687 | 10/1934 | Pearmain | 192/107 T X |
| 2,080,314 | 5/1937 | Hoof | 192/107 T X |
| 2,251,588 | 8/1941 | Gilbert | 192/54 |
| 3,001,622 | 9/1961 | Goldberg | 192/107 T X |
| 3,148,750 | 9/1964 | Kershner | 192/93 R X |
| 3,261,437 | 7/1966 | Kramm | 192/35 X |
| 3,443,670 | 5/1969 | Margetts | 192/93 R X |
| 3,819,016 | 6/1974 | Radcliffe et al. | 92/80 X |
| 4,159,049 | 6/1979 | Merz | 192/102 T |
| 4,598,807 | 7/1986 | Clegg | 192/80 |

Primary Examiner—Allan D. Herrmann
Assistant Examiner—Nicholas Whitelaw
Attorney, Agent, or Firm—Hill, Van Santen, Steadman & Simpson

[57] ABSTRACT

A clutch arrangement incorporates a rotating disk and a split ring adapted to be closed to establish peripheral contact with the rotating disk. A lever applies a closing force to the split ring as the split ring is rotated in a direction of rotation of the rotating disk, and an initiating member is provided in the form of an air cylinder, for making initial closure of the split ring and thereby starting rotation of the lever.

9 Claims, 2 Drawing Sheets

SELECTIVELY OPERABLE SPLIT RING CLUTCH

BACKGROUND OF THE INVENTION

This invention relates to a split ring clutch, and more particularly to such a clutch which is suitable for intermittent motion or indexing of a rotatable shaft or disk.

A number of clutches for intermittent application have been developed in the past. A conventional clutch mechanism, for example, incorporates a clutch plate which is forced against a rotatable member for imparting angular movement to the clutch plate. Such a mechanism is normally not self engaging, is made up of a large number of parts, and requires a relatively large operating force, and a large motion to move between engaged and disengaged positions. It also requires a friction disk which is subject to wear, and has a relatively high inertia for any given torque rating.

An alternative clutch arrangement incorporates sprag or needle bearings. Such a clutch is capable of rotation in one direction, but no disengagement is possible in the reverse direction of rotation. It typically requires a thick, high inertia shell, and in the event of a torque overload, a catastrophic failure results. The needle rollers and sprag are highly stressed, and the clutch is not adjustable with respect to a torque limit.

A spiral spring clutch has been used for applications requiring a low torque rating. Such a clutch has relatively large drag forces, and operates in only one direction. Also, it has a high rotational flex at high torque levels, and the spring ends are subject to breakage. A chain and lever clutch design has also been proposed, which is characterized by high flexing, and relatively low torque. It does not have precision engagement, and operates in a single direction of rotation.

SUMMARY OF THE INVENTION

It is desirable to provide a clutch suitable for intermittent motion which is not subject to the disadvantages mentioned above with respect to previous clutch designs.

In one embodiment, the invention provides a simple and rigid construction suitable for compact, low inertia, high torque applications, and which requires only a very small force and a small degree of motion to effect engagement of the clutch. The invention allows the use of a solid steel ring with a large cross section and a solid lever, both of which provide for a high torque capacity with a minimum of flexing.

The clutch of the present invention is free floating when disengaged, and has the possibility of setting the preset limit torque or an adjustable maximum torque. If desired, movement of the parts can be damped with a simple oil damper. The clutch of the present invention allows for precise adjustable rotation for either braking or intermittent rotation.

Other objects and advantages of the present invention will become manifest upon an inspection of the accompanying drawings and the following description.

BRIEF DESCRIPTION OF THE DRAWINGS

Reference will now be made to the accompanying drawings, in which.

DESCRIPTION OF THE PREFERRED EMBODIMENT

Figure 1:
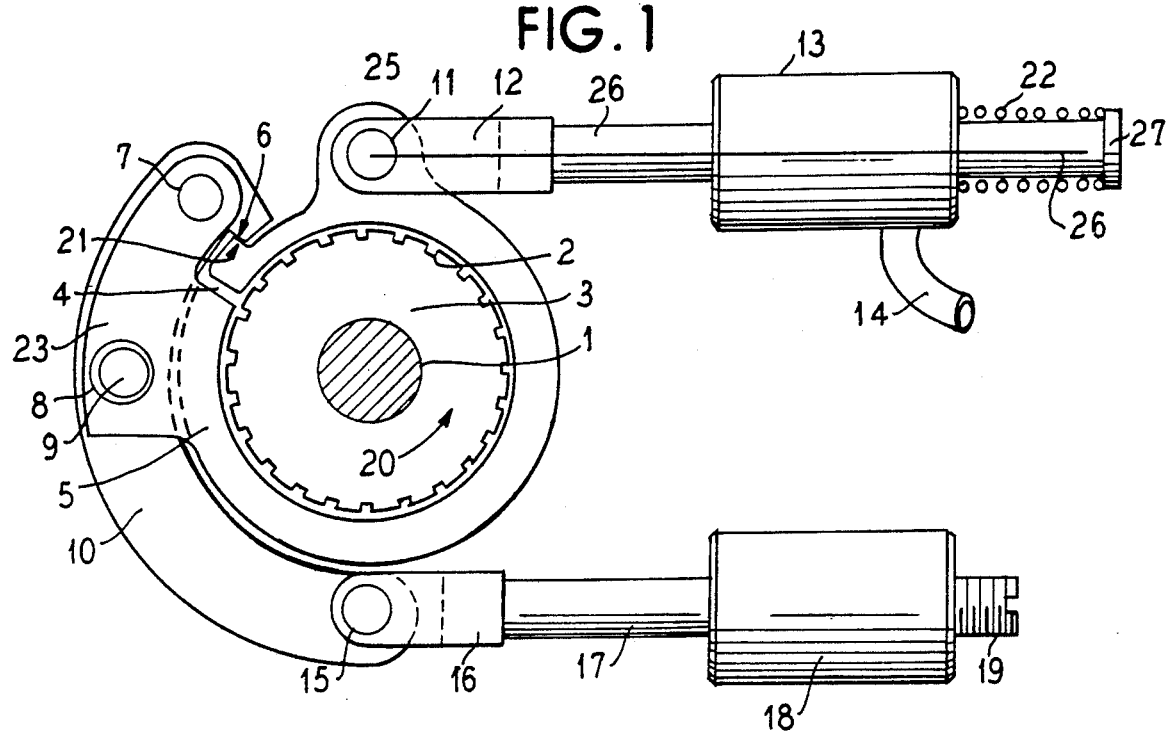
FIG. 1 is a plan view of a clutch incorporating the present invention.

FIG. 1 illustrates an illustrative embodiment of the present invention. A driving shaft 1 is connected to a metal disk 3, which rotates with the shaft 1. The rotation is counterclockwise, as indicated by the arrow 20. The disk 3 is surrounded by a split metal ring 5, which has a inner diameter slightly larger than the diameter of the disk 3, to allow the disk 3 to freely rotate when the parts are in the condition illustrated in FIG. 1. The split metal ring 5 has a gap 4, which is sufficiently large to allow the ring 5 to grip the disk 3 all the way around its periphery, when the ring 5 is compressed.

A protuberance 25 is provided at the upper end of the ring as illustrated in FIG. 1, and a pin 11 is journaled therein. A yoke 12 is rotatably supported on a pin 11, and is connected to the actuator 26 of a air cylinder 13. A conduit 14 connects the cylinder 13 to a source of pressurized air, which serves as the control signal for operation of the clutch. When the air pressure in the conduit 14 is increased, the actuator 26 of the cylinder 13, together with the yoke 12, move leftwardly as illustrated in FIG. 1. The rear end of the actuator 26 has a flange 27, and a spring 22 is trapped between the flange 27 and the cylinder 13. As the actuator moves leftwardly, the spring 22 is compressed, and the spring 22 serves to return the actuator shaft to the neutral position as illustrated in FIG. 1 when the pressure in the conduit 14 is reduced to ambient.

The left side of the split metal ring 5, as shown in FIG. 1, is provided with upper and lower flanges 23 and 24, and a pin 7 is journaled therein. A circular lever 10 has one end rotatably mounted on the pin 7, and has a pin 15 at its other end, which is rotatably received in a yoke 16. This yoke 16 is connected to the shaft 17 of an oil damper 18, the stroke of which is adjustable by means of an adjustable screw 19. The oil damper has a conventional construction, in which a piston moves within an oil filled cylinder, such that movement is resisted but not impeded, until the piston reaches the limit of the screw adjustment 19.

The lever 10 also supports a further pin 9, which is received in loose fitting relationship in a pair of apertures 8, provided in the flanges 23 and 24. The oil damper 18, with its actuating shaft 17, is arranged such that the shaft 17 can move only rectilinearly, that is, in a left and right direction as illustrated in FIG. 1.

The upper end of the lever 10 is provided with a tang 6, which engages a projection 21 provided on the upper split portion of the split ring 5.

In operation, the air pressure in the conduit 14 increases, forcing the actuator of the cylinder leftwardly, and with it, the yoke 12 and the pin 11. This causes the upper portion of the split ring 5 to be compressed, and to move inwardly until it engages the surface of the rotating disk 3. As the rotating disk 3 engages the upper portion of the split ring, it applies counterclockwise rotation to the split ring, tending to further compress the upper portion of the split ring and increase the force with which the split ring is rotated in a counterclockwise direction.

As the split ring rotates in a counterclockwise direction, by rotation of the disk 3, it carries the pin 7, together with the lever 10, in a counterclockwise direction, and moves the shaft 17 of the oil damper rightwardly. This movement is resisted by normal operation of the oil damper, such that the lever 10 rotates in a clockwise direction about the pin 7, whereby the tang 6 applies a force against the projection 21, serving to more tightly compress the split ring 5 against the rotating disk 3.

The split ring continues to rotate in a counterclockwise direction, until the piston within the oil damper 18 reaches the stop set by the screw adjustment 19, and the normal operation of the oil damper 18 ensures that the movement toward the stop is at a controlled speed, so that the counterclockwise movement of the split ring and the parts associated with the oil damper are brought to a soft stop without rebound.

The relationship between the pin 9 and the corresponding aperture 8 limits the amount of rotation of the lever 10 about the pin 7. This limits the amount of compression of the split ring 9 which can be effected by means of rotating the lever 10 about the pin 7, and therefore establishes a set maximum torque which can be exchanged between the rotating disk 3 and the split ring 5. When torque in excess of this limit is applied to the rotating disk 3, the disk is allowed to slip within the split ring 5.

The maximum torque of the clutch is increased very slightly by the leftward force exerted on the actuator of the cylinder 13, as long as the air pressure is applied to the conduit 14. However, this force is relatively small, since the purpose of this force is simply to make the initial contact between the upper part of the split ring 5 and the rotating disk 3. As long as this slight amount of force and a torque on disk 3 is supplied, the clutch remains engaged, with the total compression of the split ring being determined mostly by the angular position of the lever 10 relative to the pin 7. A movement of only 0.00015 inch of the actuator 26 is needed to initiate operation of the clutch, when the ring-disk spacing is about 0.0005 inch.

When the air pressure on the conduit 14 is brought down to an ambient level, the spring 22 tends to return the actuator of the air cylinder 13 to its rightward position as illustrated in FIG. 1, which allows the split ring 5 to open. Rightward movement of the actuator of the air cylinder 13 rotates the split ring 5 in a clockwise direction, which rotation is resisted by the oil damper 18. This resistance tends to rotate the lever 10 in a counterclockwise direction about the pin 7, withdrawing the tang 6 from the projection 21, and allowing the split ring 5 to expand to the non-actuated condition illustrated in FIG. 1.

In order to maximize the efficiency of operation of the clutch, it is desirable to have the thickness of the disk 3, and the corresponding dimension of the split ring 5, relatively large. Preferably, this dimension of the disk 3 and split ring 5 should be at least one third of the diameter of the disk, in order to positively prevent any tendency for a skewed relationship between the split ring 5 and the disk 3.

The outside surface of the disk 3 has a multiplicity of grooves 2 cut therein, to facilitate removal of any air or oil which finds its way in between the disk and split ring. Alternatively, these grooves may be provided on the interior surface of the split ring 5, or one or both surfaces may be roughened.

Figure 2:
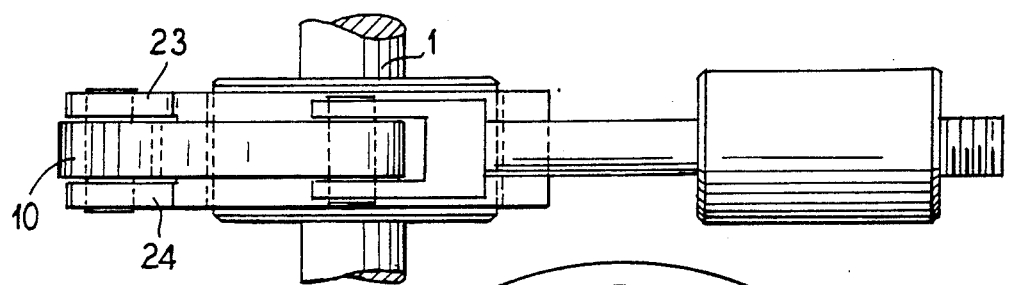
FIG. 2 a side view of the apparatus of FIG. 1.

In the arrangement illustrated in the drawings FIG. 1 and FIG. 2, the clutch is adapted to supply a braking torque to rotation of the disk 3 and shaft 1. The maximum torque is set by the relationship between the pin 9 and the aperture 8 in which it is received. As excess torque is supplied to the rotating shaft 1, it, and the disk 3, continue to rotate, so that there is no catastrophic failure of the clutch in the event the torque limit is exceeded. It is apparent that the specific value for the maximum torque can be set by correctly positioning the pin 9 and the aperture 8. If desired, this may be made adjustable. The diameter of the aperture 8 in relation to the diameter of the pin 9, establishes the maximum amount of movement of the lever 10, as it is rotated about the pin 7.

It is apparent that the clutch of the present invention can be employed to furnish an intermittent movement when desired. The intermittent movement may be taken off at the position of a shaft of the air cylinder 13, ie. connected rightwardly of the position of the spring 22. Alternatively, the split ring 5 may be connected to a gear which supplies intermittent motion to a rack engaged therewith, or intermittent rotary motion to another gear in engagement therewith. Alternatively, one end of a lever or bell crank may be connected to any of the pins 11, 7, 9 or 15, in order to supply intermittent rotary or rectilinear motion, via the lever, or a link connected to the other end of the bell crank.

Figure 3:
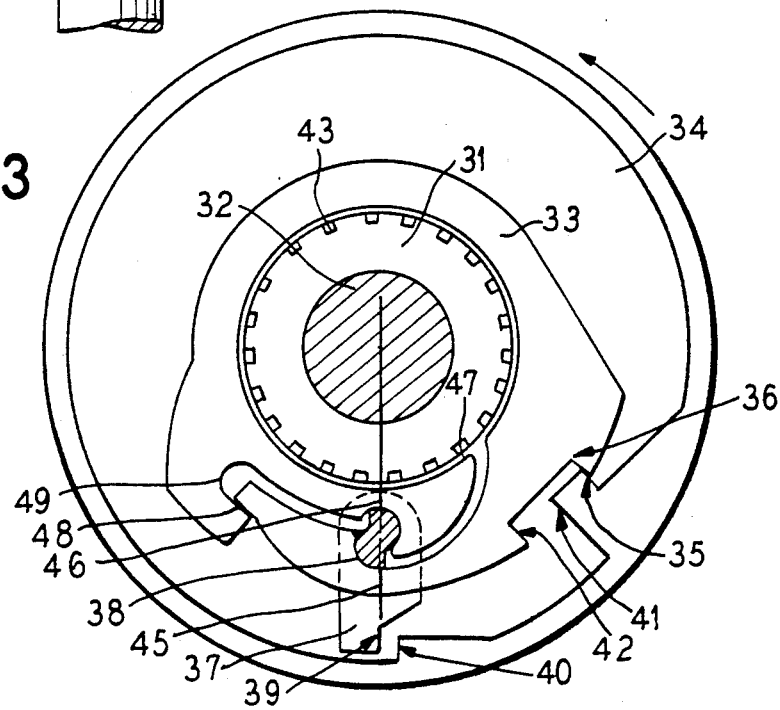
FIG. 3 a plan view of an alternative embodiment concept with a variation of the locking mechanism.

FIG. 3 illustrates a variation of this invention, in the form of an over running clutch.

The disk 31 is firmly attached to the shaft. The split ring 33 surrounds the disk 31 with a small amount of diametrical interference which creates a slight amount of rotational drag. The entire assembly is enclosed in a circular housing 34 which is free to rotate around the shaft 32 in the counterclockwise direction. The ring 33 rotates together with the housing 34 due to the engagement of the projection 35 against the groove 36 on the ring. A clockwise rotation of the housing 34 causes the split ring 33 to firmly engage the disk 31 due to the locking rotation of the lever 37 and cam 38, which is actuated when the projection 40 contacts the lever surface 39.

The lever 37 continues to defect as more torque is applied. When the projection 41 contacts surface 42, the entire assembly is locked and rotates together.

The clearance between surfaces 41 and 42, minus the clearance between surface 39 and 40 determines the amount of compression on the ring 33, which in turn determines the maximum torque available between the shaft 32 and housing 34. This clearance may be adjusted to provide overload protection.

A multiple of fine grooves are placed on the periphery of the disk 31 for the purpose of bleeding out air and oil when the clamping action takes place. The grooves are inserted at an angle to the axis for the purpose of providing lubrication in the over running rotational direction.

Figure 4:
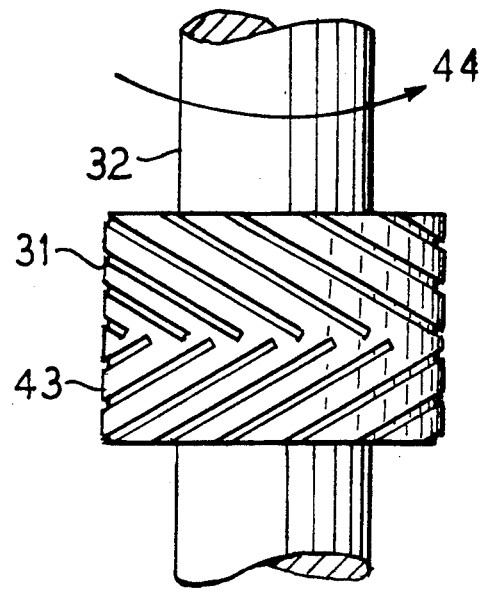
FIG. 4 a bottom view of the shaft and disk only.

FIG. 4 is a bottom projection of the disk and shaft of FIG. 3. When the ring 33 rotates in the direction shown by the arrow 44, oil contained within the housing will be forced towards the center of the disk 31 by the viscous action of the rotating ring 33 actuating against the angled grooves. The oil creates a high pressure between the disk 31 and ring 33 which in turn expands the ring 33 and provides a diametrical clearance.

When the ring 33 rotates in the opposite direction, the oil rapidly flows out along the angled grooves to provide a metal to metal contact for the high friction required for engagement.

In most applications, it is desireable to have a compact assembly with a small diameter housing. The double cam design 38 allows the maximum ring cross section 45 and 46 for a given radial length. The disadvantage of this arrangement is that a force applied to the ring 33 for the clamping action creates a high bending moment on the cross section 45 and 46 of the ring. End extensions 47 and 48 are provided for the purpose of eliminating the stresses due to this bending moment. The extensions 47 and 48 are required to be greater than 1.5 times the section thickness to be effective.

The interlocking extension 48 into a groove on the ring 49 provides a low cast, low friction arrangement.

Other advantages of this design is that the cross pin 38 is a single solid piece with a large surface area in contact with the entire width of the ring 33. This pin has a high section modulus which allows a long length, which in turn allows a thicker ring than one that would be possible if a cross pin such as item 7 in FIG. 1 were used.

Another advantage of this cam design 38 is that the ring 33 can be readily assembled from a stack of thin stamped sheet metal.

Figure 5:
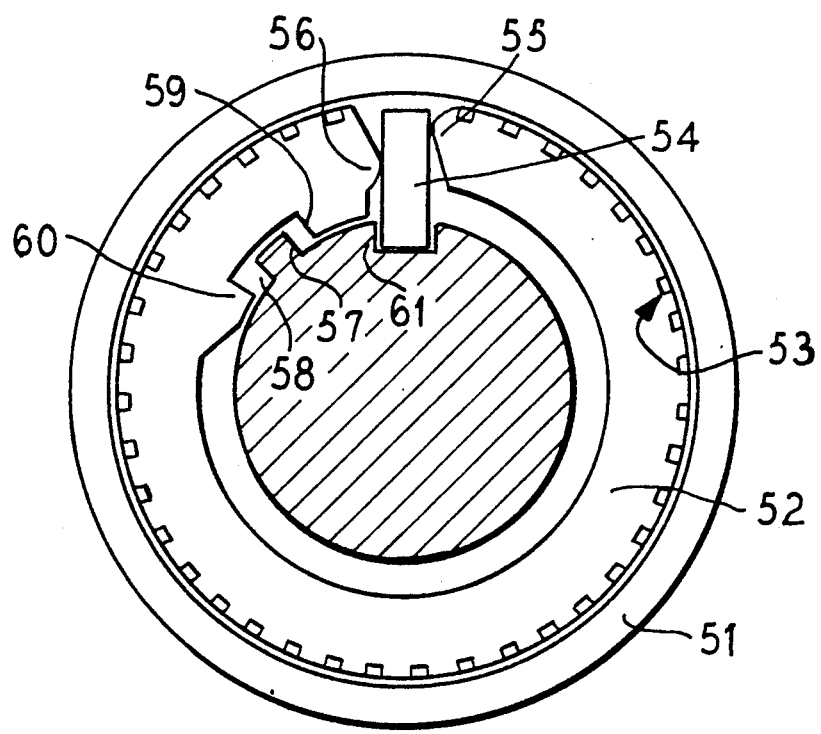
FIG. 5 a plan view of an over running clutch

FIG. 5 illustrates an over running clutch with the disk, ring and engagement mechanisms similar to the designs of FIG. 3 with the exceptions that the shaft contains the engagement mechanisms, the engagement surface is on the periphery of the ring and the inside diameter of the housing is in contact with the ring.

The arrangement of the components of this design allows a smaller outside diameter, a balanced inertial mass, simpler components to manufacture and a high torque capacity due to the engagement surface being at a greater radial distance than the design of FIG. 4.

A circular housing 51 contains a smooth inside surface and is free to rotate around the axis of the shaft 50.

A solid steel ring 52 or a stack of laminates are concentrically placed inside of this housing 51 with a minute amount of diametrical interference. The solid steel ring contains a multiple of grooves. A stack of laminates would have a small amount of separation between the plates which could be sufficient to serve the same function as the grooves machined into a solid ring.

A cross plate 54 is positioned within the slot of the ring 52, and the inner edge of this plate is loosely engaged into a keyway 61 in the shaft 50.

A projection 57 on the shaft 50 engages the ring 52 during operation.

With the shaft 50 stationary, the housing 50 is free to rotate in the counterclockwise direction. During this rotation, the ring is held stationary when surface 59 on the ring contacts surface 57 on the shaft projection. The cross plate 54 is free to oscillate within the groove 61 and the cam surfaces 55 and 56 are radially positioned to provide a declamping movement on the ring.

When the housing 51 is rotated in the clockwise direction, the cross bar 54 will pivot within the groove 61 and expand the ring by exerting forces on the ring ends 55 and 56. As the torque increases, the cross bar 54 continues to deflect, creating greater expansion of the ring 52, until surface 58 contacts surface 60. The entire assembly will then rotate as a single unit.

The gap between surfaces 58 and 60 will determine the maximum amount of torque transmitted between the ring 52 and housing 51 by means of the oscillation of the cross bar 54.

If the cross plate 54 is sightly larger than the spaced provided between the housing 51 and ring 50, a reverse rotation causes the plate 54 to lock radially. A wedging plate with this function is commonly known as a sprag and may be used to initiate the engagement of the ring 5 to the housing 51.

Other modifications and additions will be apparent to those skilled in the art, without departing from the essential features of novelty of the present invention, which are intended to be defined and secured by the appended claims.

What is claimed is:

1. A clutch assembly comprising:
    a rotatable disk or housing;
    a single convolution split ring positioned concentrically in contact or in close peripheral proximity to said disk or housing with one or both contact surfaces containing a multitude of grooves or a rough surface for the purpose of bleeding out air or oil;
    said ring having a clamping means operative to compress or expand the ring in response to operation of said clamping means to selectively provide a clamping force between both surfaces when said clamping means is operated, and an output member attached to said ring, said output member being moved by said ring when said clamping means is operated.

2. Apparatus according to claim 1, wherein said split ring is actuated by a lever having a mechanical ratio greater than 2 to 1.

3. Apparatus according to claim 1, wherein said disk, is constructed of a homogeneous piece of metal and has a thickness to diameter ratio greater than 30%.

4. Apparatus according to claim 1, wherein said clamping means comprises a clamping lever including means to limit the movement of the clamping lever for the purpose of limiting the maximum torque transmitted.

5. Apparatus according to claim 1, including means to minimize the bending moment stresses by extending the ends of said ring past said clamping means by a length to ring section thickness that is greater than 1.5 to 1.

6. Apparatus according to claim 5, including means to contain the extended ends of said rings within a groove located in said ring.

7. Apparatus according to claim 1, including grooves that are positioned at an angle to the axis of rotation for the purpose of lubricating the ring and bleeding out the oil in the reverse direction at a faster rate.

8. Apparatus according to claim 1, including a solid clamping shaft with two cam surfaces in contact with the split ends of the ring for the purpose of expanding or closing said ring.

9. Apparatus according to claim 1, including means to initiate engagement of said ring with a sprag.

* * * * *